United States Patent [19]

Stollenwerk et al.

[11] Patent Number: 5,261,304
[45] Date of Patent: Nov. 16, 1993

[54] BAND SAW RADIUS TOOL APPARATUS

[76] Inventors: Gerald J. Stollenwerk; Hallie R. Stollenwerk, both of 9628 Skyline Dr., Allenton, Wis. 53002-9743

[21] Appl. No.: 976,565

[22] Filed: Nov. 16, 1992

[51] Int. Cl.$^5$ .................... B27B 25/08; B27B 27/10
[52] U.S. Cl. ................... 83/410.8; 83/435.1; 83/439; 83/733; 83/788; 144/287
[58] Field of Search ............ 83/410.7, 410.8, 410.9, 83/435.1, 733, 439, 788; 144/137, 154, 287

[56] References Cited

U.S. PATENT DOCUMENTS

| 51,587 | 12/1865 | Hayden | 83/410.9 |
|---|---|---|---|
| 63,658 | 4/1867 | Shumard et al. | 83/410.9 |
| 111,553 | 2/1871 | Love | 144/287 |
| 707,179 | 8/1902 | Swindell | 83/410.9 |
| 754,343 | 3/1904 | Piper | 83/410.9 |
| 1,420,218 | 6/1922 | Richards | 83/410.8 |
| 1,864,840 | 6/1932 | Lehner | 144/287 |
| 1,944,524 | 1/1934 | Parrish | 83/410.8 |
| 2,535,673 | 12/1950 | Forbes | 83/410.9 |
| 3,908,722 | 9/1975 | Jacobs | 83/410.8 |

Primary Examiner—Hien H. Phan
Attorney, Agent, or Firm—Leon Gilden

[57] ABSTRACT

A tool member mounted in adjacency to a band saw table, including a pivot plate pivotally mounted to an underlying support mounting a pivot head leg at a forward end of the pivot plate, wherein the pivot head leg is arranged for securement to a workpiece to direct the workpiece in a cooperative relationship with an associated band saw blade to effect a radius cut of the workpiece.

4 Claims, 4 Drawing Sheets

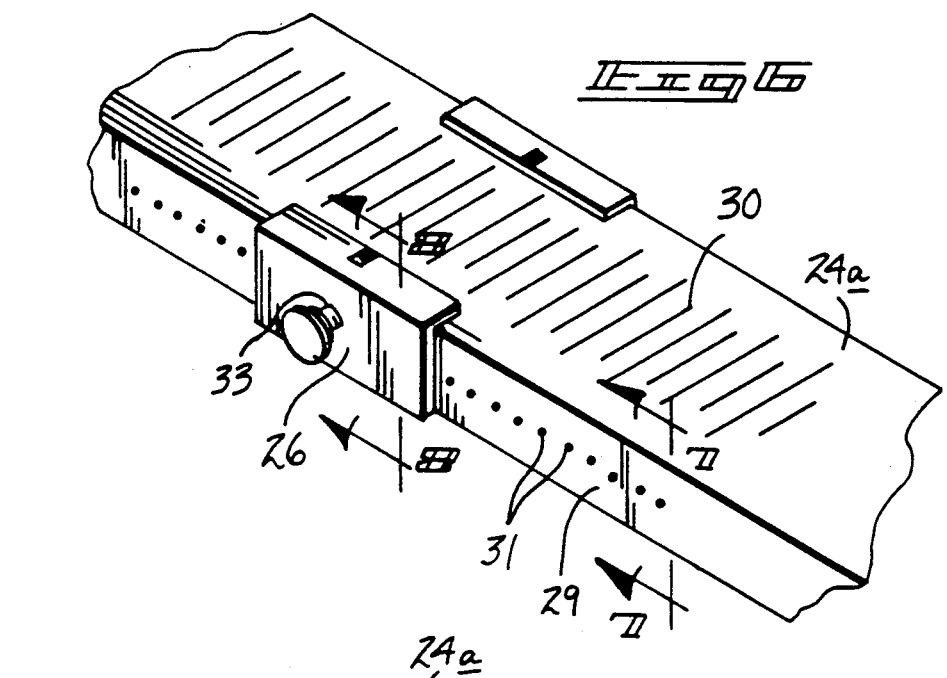
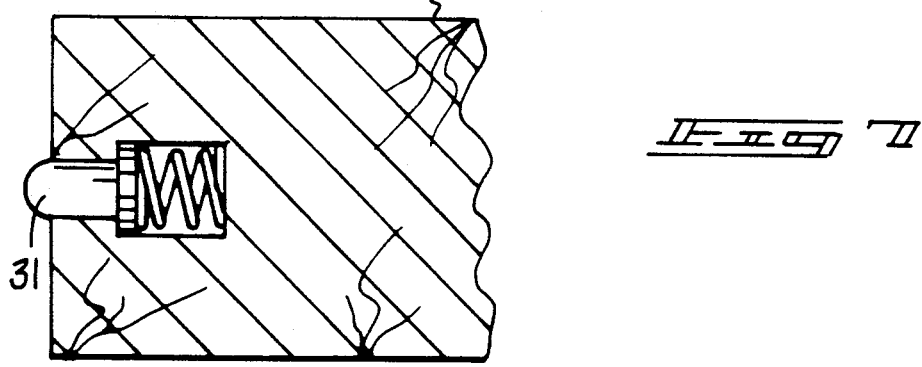
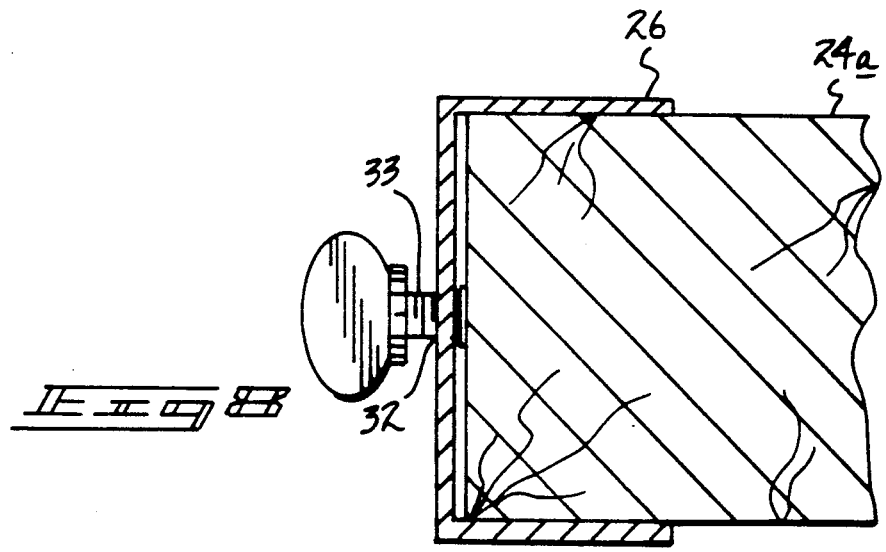

BAND SAW RADIUS TOOL APPARATUS

BACKGROUND OF THE INVENTION

1. Field of the Invention

The field of invention relates to band saw apparatus, and more particularly pertains to a new and improved band saw radius tool apparatus wherein the same is arranged to permit the cutting of arcuate exterior shapes to various workpieces in a wood working procedure.

2. Description of the Prior Art

Band saw structure relative to wood working has been availed in the prior art and various saw table structure for cutting a workpiece has been utilized, such as in U.S. Pat. No. 4,398,440 to Epstein utilizing a table saw structure.

The instant invention attempts to overcome deficiencies of the prior art by employing a guide structure in association with a band saw to project a workpiece positioned upon the guide structure in an arcuate relationship relative to the band saw to permit the cutting of radius or curvilinear lines.

SUMMARY OF THE INVENTION

In view of the foregoing disadvantages inherent in the known types of band saw apparatus now present in the prior art, the present invention provides a band saw radius tool apparatus wherein the same is arranged to arcuately directed a workpiece past a band saw cutting blade. As such, the general purpose of the present invention, which will be described subsequently in greater detail, is to provide a new and improved band saw radius tool apparatus which has all the advantages of the prior art band saw apparatus and none of the disadvantages.

To attain this, the present invention provides a tool member mounted in adjacency to a band saw table, including a pivot plate pivotally mounted to an underlying support mounting a head leg at a forward end of the pivot plate, wherein the pivot head leg is arranged for securement to a workpiece to direct the workpiece in a cooperative relationship with an associated band saw blade to effect a radius cut of the workpiece.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved band saw radius tool apparatus which has all the advantages of the prior art band saw apparatus and none of the disadvantages.

It is another object of the present invention to provide a new and improved band saw radius tool apparatus which may be easily and efficiently manufactured and marketed.

It is a further object of the present invention to provide a new and improved band saw radius tool apparatus which is of a durable and reliable construction.

An even further object of the present invention is to provide a new and improved band saw radius tool apparatus which is susceptible of a low cost of manufacture with regard to both materials and labor, and which accordingly is then susceptible of low prices of sale to the consuming public, thereby making such band saw radius tool apparatus economically available to the buying public.

Still yet another object of the present invention is to provide a new and improved band saw radius tool apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an isometric illustration of a modified pivot plate structure of the invention.

FIG. 7 is an orthographic view, taken along the lines 7—7 of FIG. 6 in the direction indicated by the arrows.

FIG. 8 is an orthographic view, taken along the lines 8—8 of FIG. 6 in the direction indicated by the arrows.

DESCRIPTION OF THE PREFERRED EMBODIMENT

Figure 1:
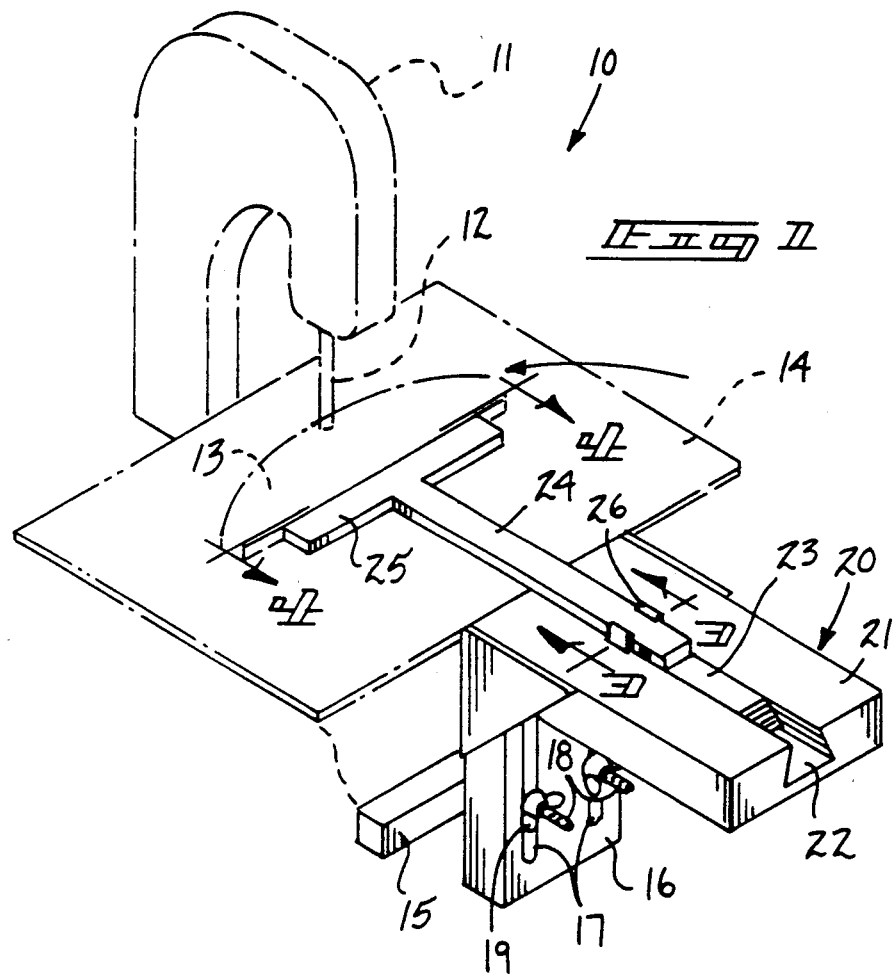
FIG. 1 is an isometric illustration of the invention.

With reference now to the drawings, and in particular to FIGS. 1 to 11 thereof, a new and improved band saw radius tool apparatus embodying the principles and concepts of the present invention and generally designated by the reference numeral 10 will be described.

Figure 2:
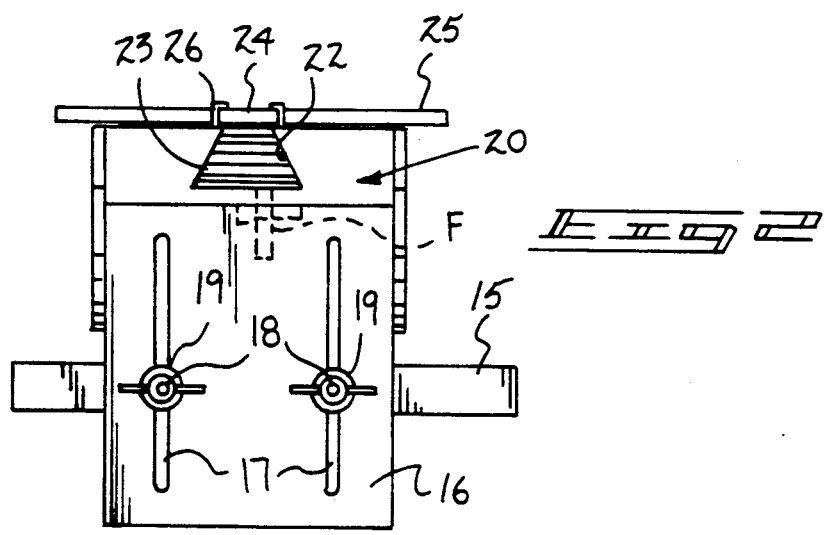
FIG. 2 is an orthographic end view of the invention.
Figure 3:
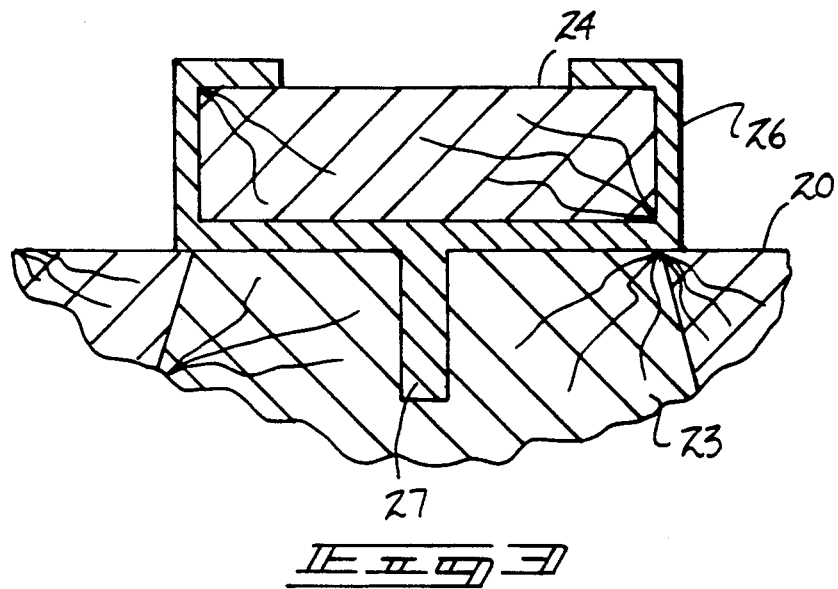
FIG. 3 is an orthographic view, taken along the lines 3—3 of FIG. 1 in the direction indicated by the arrows.
Figure 4:
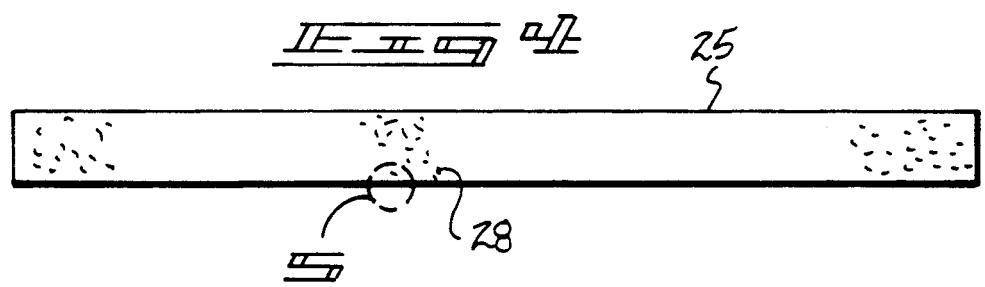
FIG. 4 is an orthographic view, taken along the lines 4—4 of FIG. 1 in the direction indicated by the arrows.
Figure 5:
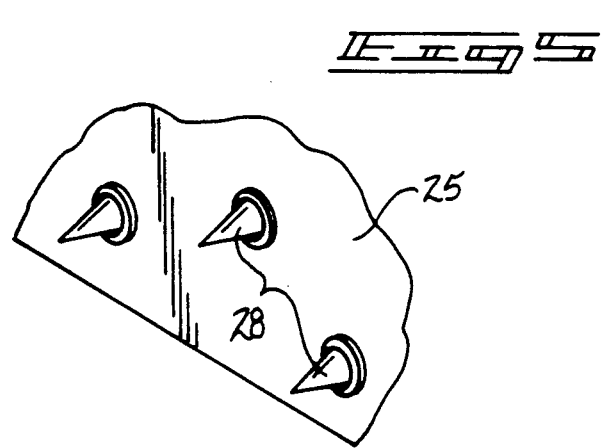
FIG. 5 is an enlarged isometric illustration of section 5 as set forth in FIG. 4.

More specifically, the band saw radius tool apparatus 10 of the instant invention essentially comprises a band saw assembly 11, having a band saw blade 12, where it is understood that various other blades may be utilized, such as circular saw blades and the like. A workpiece 13 is slidably mounted on a top surface of a table plate 14 of the band saw assembly 11. A frame leg 15 of the band saw assembly 11 includes a mounting plate 16 vertically and adjustably mounted thereto, wherein the mounting plate 16 includes a plurality of mounting plate slots 17, with each slot receiving a fastener rod 18 having a fastener plate 19 arranged for fixed securement of each fastener rod 18 onto the mounting plate 16 to secure the mounting plate 16 between the fastener plates 19 and the frame leg 15 to arrange in a coplanar relationship a position plate 20 that is orthogonally fixed at an upper distal end of the mounting plate 16 to provide for the coplanar relationship of the position plate top wall 21 with the top surface of the table plate 14. The position plate 20 includes a groove 22 directed therethrough orthogonally oriented relative to the mounting plate 16, with the groove 22 typically of a trapezoidal configuration. A slide bar 23 is complementarily received within the groove 22 for adjustment therealong. A fastener may be utilized of any desired type to secure the slide bar 23 within the groove 22, such as a fastener structure "F" as indicated in FIG. 2.

A pivot plate 24 is mounted pivotally to the top surface of a slide bar 23 that is coplanar with the position plate top wall 21. The pivot plate 24 includes a pivot head leg 25 orthogonally mounted to the pivot plate 24 at its forward distal end, with the pivot plate head 25 slidably mounted over the table plate 14 positioning the workpiece 13 thereagainst, and more particularly to a matrix of grip projections 28 projecting from the head legs forward wall, as indicated in the FIGS. 4 and 5 for example.

A clamp bracket 26 engages the side walls 29 of the pivot plate, with the clamp bracket 26 having a clamp bracket rod 27 fixedly mounted to the clamp bracket 26 and extending orthogonally into the top surface of the slide bar 23. The clamp bracket rod 27 is orthogonally oriented relative to the top wall 21, as well as the top surface of the slide bar 23 and orthogonally oriented relative to the pivot plate 24.

In this manner, the workpiece as mounted and indicated in FIG. 1 is directed past the blade 12 as the pivot plate 24 is pivoted about the rod 27.

The FIG. 6 indicates the use of a modified pivot plate 24a. The pivot plate 24a includes the use of a series of gradation lines 30 mounted to a top surface of the pivot plate 24a, with indicators on the bracket 26, as indicated in FIG. 6. A plurality of spring biased plungers 31 are directed into at least one of the side wall 29 of the pivot plate 24a, with the plungers 31 cooperative with a plunger receiving cavity 32 within a confronting interior surface of the bracket 26 relative to the plungers 31 to position the pivot plate 24a initially relative to the bracket 26. An externally threaded lock rod 33 is directed through the bracket 26 into engagement with the side wall 29 to further secure fixedly the bracket relative to the pivot plate 24a, as indicated in FIG. 8.

Figure 9:
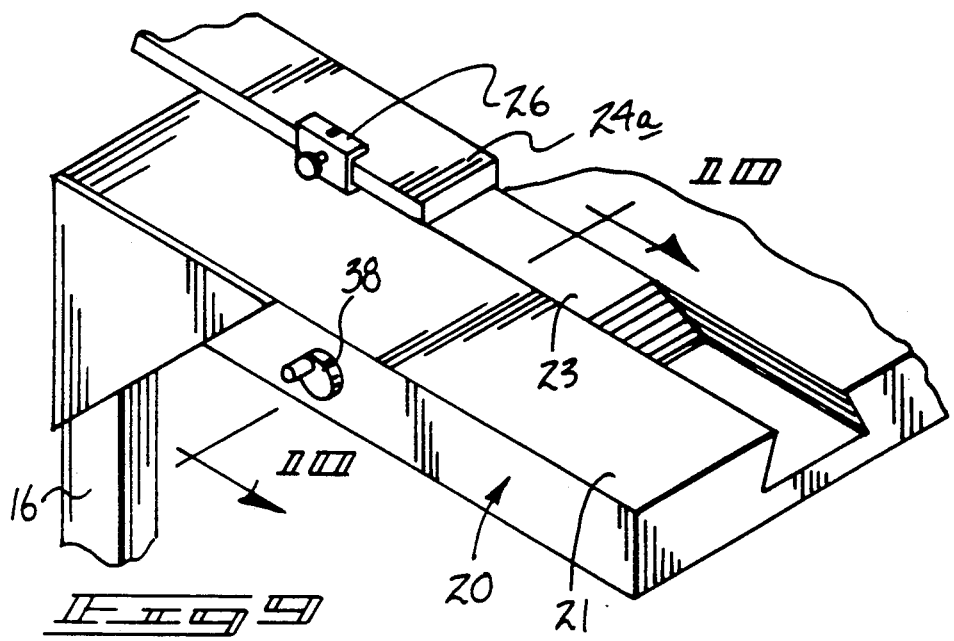
FIG. 9 is an isometric illustration of a modified adjusting structure for the slide bar of the invention.
Figure 10:
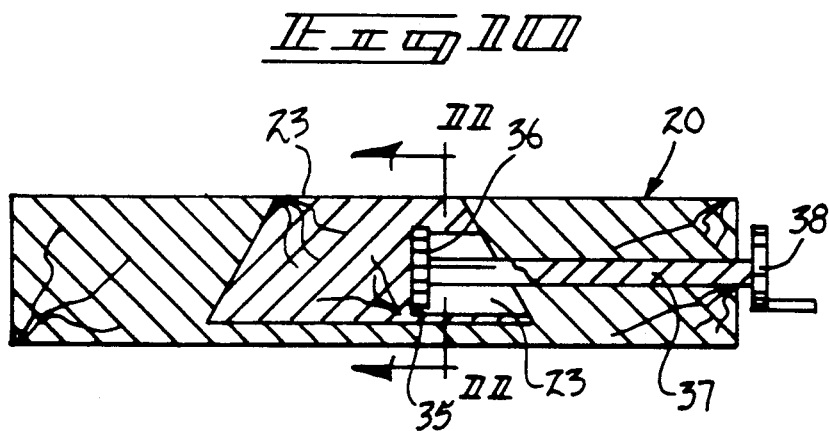
FIG. 10 is an orthographic view, taken along the lines 10—10 of FIG. 9 in the direction indicated by the arrows.
Figure 11:
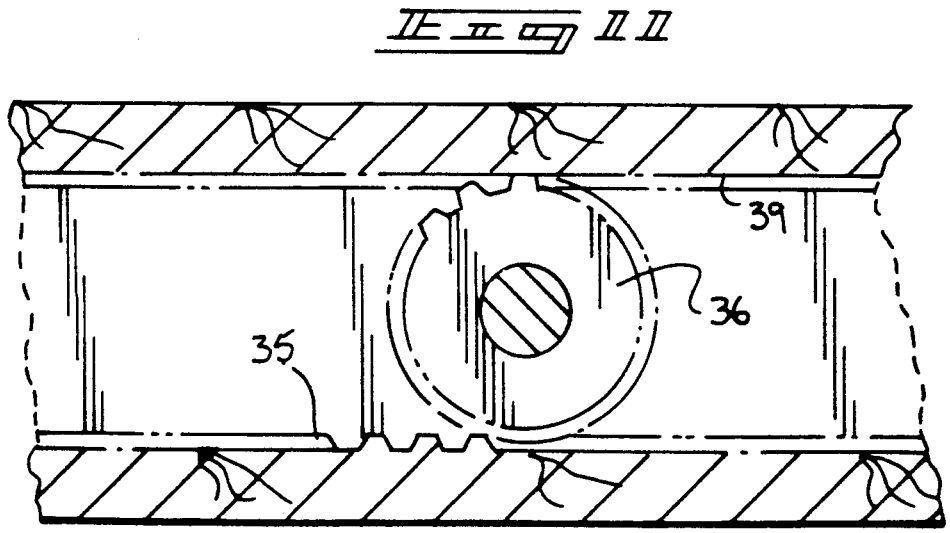
FIG. 11 is an orthographic view, taken along the lines 11—11 of FIG. 10 in the direction indicated by the arrows.

Further, the slide bar 23 is arranged for construction in the organization, as indicated in FIGS. 9-11, with the slide bar cavity 24 coextensive and longitudinally aligned relative to the slide bar 23, with a gear rack 35 mounted to the floor of the slide bar 23 parallel to a cavity groove 39, with a gear wheel 36 positioned within a cavity groove 39 and engaged with the gear rack 35. The gear wheel 36 includes a drive rod 37 fixedly and orthogonally mounted thereto in a coaxially aligned relationship, with the drive rod 37 projecting through a side wall of the position plate 20 terminating in a drive rod handle 38 to permit ease of rotation of the drive rod, and accordingly the gear wheel 36, to direct the slide bar 23 orthogonally relative to the mounting plate 16. It should be noted that the gear rack 35 and the cavity groove 39 are also in an orthogonal relationship relative to the mounting plate 16. In this manner, incremental adjustment is eased in use of the organization relative to the cutting blade 12.

It should be noted that the clamp bracket 26 being movable into the saw blade or away therefrom to permit determination of a dimension of radius to be cut by the structure of the invention. Further, the pivot plate 24 and the pivot plate head 25 are adjustable to accommodate a predetermined width of material being reshaped. While graduation of the pivot plate 30 is indicated, it is further noted that graduations may be positioned on the positioning plate top wall 21 in relating to the clamp bracket 26 for graduated adjustment therebetween.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape form, functions and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A brand saw radius tool apparatus, comprising,
   a saw assembly, having a movably mounted saw blade, and
   a table plate receiving the saw blade, the table plate including a frame leg positioned below the table plate, and a mounting plate adjustably mounted relative to the frame leg, and the mounting plate including a mounting plate upper end and the mounting plate upper end including a position plate orthogonally and fixedly mounted to the mounting plate upper end defining an "L" shaped configuration of the mounting plate and the position plate, the position plate including a position plate top wall coplanar with a table plate top surface, and a slide bar slidably mounted within the position plate orthogonally oriented relative to the mounting plate, and the slide bar having a slide bar top surface, and a pivot plate pivotally mounted to the slide bar top surface, the pivot plate having a pivot plate head leg orthogonally mounted to the pivot plate over the table plate to secure a workpiece to the pivot plate head leg relative to the saw blade, and the mounting plate includes a plurality of parallel slots directed therethrough, and a plurality of fastener rods directed fixedly from the frame leg, with one of the fastener rods extending through one of the parallel slots, and each of the fastener rods includes a fastener plate, wherein each fastener plate positions the mounting plate between the respective fastener plate and the frame leg permitting loosening of the fastener plates and sliding of the mounting plate along the parallel slots relative to the fastener rods, and a position plate top wall and a slide bar top surface are coplanar, and the position plate including a position plate groove, with the slide bar received within the position plate groove, and the pivot plate having pivot plate side walls, and a clamp bracket secured to the pivot plate side walls, and the clamp bracket including a clamp bracket rod fixedly and orthogonally mounted to the clamp bracket and orthogonally mounted relative to the slide bar top surface and extending into the slide bar from the slide bar top surface permitting pivoting of the pivot plate relative to the slide bar, and the pivot plate head leg including a matrix of projections extending therefrom to engage in said workpiece.

2. An apparatus as set forth in claim 1 wherein at least one of the pivot plate side walls includes a row of spaced spring biased plungers projecting from said side wall, and the clamp bracket includes a plunger receiving cavity in confronting relationship to at least said one side wall to receive one of said plungers therewithin.

3. An apparatus as set forth in claim 2 including an externally threaded lock rod directed through the clamp bracket for engagement with at least one side wall to secure the pivot plate relative to the clamp bracket.

4. An apparatus as set forth in claim 3 wherein the slide bar includes a slide bar cavity coextensive therewith, and the slide bar cavity having a slide bar cavity floor and a slide bar cavity roof arranged in a parallel relationship, with the slide bar cavity floor having a gear rack mounted thereon, and the slide bar cavity roof having a groove, and a gear wheel in engagement with the gear rack and positioned within the groove, and a drive rod fixedly and coaxially mounted to the gear wheel, with the drive rod extending through and projecting beyond the position plate, and the drive rod having a drive rod handle exteriorly of the position plate, whereupon rotation of the handle effects rotation of the gear wheel and reciprocation of the slide bar within the slide bar groove.

* * * * *